United States Patent
Kaewell, Jr. et al.

(10) Patent No.: US 7,630,690 B2
(45) Date of Patent: *Dec. 8, 2009

(54) ACCESS BURST DETECTOR CORRELATOR POOL

(75) Inventors: John David Kaewell, Jr., Jamison, PA (US); Timothy Berghuis, Exton, PA (US); Jan Meyer, Weilheim (DE); Peter Bohnhoff, Munich (DE); Alexander Reznik, Princeton, NJ (US); Edward L. Hepler, Malvern, PA (US); Michael Koch, Fort Salonga, NY (US); William C. Hackett, Doylestown, PA (US); David S. Bass, Great Neck, NY (US); Steven Ferrante, Warrington, PA (US)

(73) Assignee: InterDigital Technology Corp., Wilmington, DE (US)

( * ) Notice: Subject to any disclaimer, the term of this patent is extended or adjusted under 35 U.S.C. 154(b) by 1128 days.

This patent is subject to a terminal disclaimer.

(21) Appl. No.: 10/411,739

(22) Filed: Apr. 11, 2003

(65) Prior Publication Data

US 2004/0032839 A1 Feb. 19, 2004

Related U.S. Application Data

(60) Provisional application No. 60/372,531, filed on Apr. 12, 2002.

(51) Int. Cl.
*H04B 15/00* (2006.01)

(52) U.S. Cl. ............... 455/65; 455/506; 455/561; 455/562.1; 455/455.273; 375/142; 375/150; 375/147; 375/152; 370/320; 370/342; 370/335

(58) Field of Classification Search ......... 375/150, 375/152, 229, 357, 130; 370/320, 342; 455/520
See application file for complete search history.

(56) References Cited

U.S. PATENT DOCUMENTS

| 5,237,586 A | 8/1993 | Bottomley |
| 5,329,548 A | 7/1994 | Borg |

(Continued)

FOREIGN PATENT DOCUMENTS

CN 1140365 1/1997

(Continued)

OTHER PUBLICATIONS

Kong et al., "Average SNR of a Generalized Diversity Selection Combining Scheme," IEEE Communications Letters, vol. 3, No. 3, Mar. 1999, pp. 57-59.

*Primary Examiner*—Seema S Rao
*Assistant Examiner*—Henry Baron
(74) *Attorney, Agent, or Firm*—Volpe and Koenig, P.C.

(57) ABSTRACT

A Node-B/base station has an access burst detector. The access burst detector comprises at least one antenna for receiving signals from users and a pool of reconfigurable correlators. Each correlator correlates an inputted access burst code at an inputted code phase with an inputted antenna output. An antenna controller selectively couples any output of the at least one antenna to an input of any of the correlators. A code controller provides to an input of each correlator an access burst code. The code controller controls the inputted code phase of each controller. A sorter/post processor sorts output energy levels of the correlators.

11 Claims, 7 Drawing Sheets

U.S. PATENT DOCUMENTS

| | | | |
|---|---|---|---|
| 5,471,509 | A | 11/1995 | Wood et al. |
| 5,490,165 | A | 2/1996 | Blakeney, II et al. |
| 5,894,473 | A | 4/1999 | Dent |
| 5,910,948 | A * | 6/1999 | Shou et al. ................. 370/335 |
| 5,940,438 | A | 8/1999 | Poon et al. |
| 6,091,953 | A | 7/2000 | Ho et al. |
| 6,134,228 | A | 10/2000 | Cedervall et al. |
| 6,141,334 | A | 10/2000 | Flanagan et al. |
| 6,163,533 | A | 12/2000 | Esmailzadeh et al. |
| 6,275,484 | B1 | 8/2001 | Lynch et al. |
| 6,307,878 | B1 | 10/2001 | Sokolov et al. |
| 6,317,454 | B1 | 11/2001 | Mamori |
| 6,324,207 | B1 | 11/2001 | Kanterakis et al. |
| 6,324,210 | B1 | 11/2001 | Yang et al. |
| 6,333,926 | B1 | 12/2001 | Van Heeswyk et al. |
| 6,333,934 | B1 | 12/2001 | Miura |
| 6,414,984 | B1 | 7/2002 | Ståhle |
| 6,442,193 | B1 | 8/2002 | Hirsch |
| 6,463,048 | B1 | 10/2002 | Garyantes |
| 6,487,193 | B1 | 11/2002 | Hamada et al. |
| 6,567,670 | B1 | 5/2003 | Petersson |
| 6,587,448 | B1 | 7/2003 | Dajer et al. |
| 6,618,434 | B2 | 9/2003 | Heidari-Bateni et al. |
| 6,650,694 | B1 | 11/2003 | Brown et al. |
| 6,697,417 | B2 | 2/2004 | Fernandez-Corbaton et al. |
| 6,703,977 | B2 | 3/2004 | Jeschke |
| 6,714,586 | B2 | 3/2004 | Yang et al. |
| 6,728,304 | B2 | 4/2004 | Brown et al. |
| 6,748,013 | B2 | 6/2004 | Reznik et al. |
| 6,748,014 | B1 | 6/2004 | Kuo et al. |
| 6,834,075 | B2 | 12/2004 | Wang |
| 6,901,106 | B1 | 5/2005 | Chen et al. |
| 7,031,749 | B1 | 4/2006 | Mitama |
| 7,079,569 | B1 | 7/2006 | Hayata |
| 7,082,286 | B2 * | 7/2006 | Kaewell et al. ................. 455/65 |
| 2001/0017883 | A1 | 8/2001 | Tiirola et al. |
| 2001/0033614 | A1 | 10/2001 | Hudson |
| 2001/0038666 | A1 | 11/2001 | Mesecher et al. |
| 2001/0048726 | A1 | 12/2001 | Wallins |
| 2002/0010002 | A1 | 1/2002 | Heinta |
| 2002/0036998 | A1 | 3/2002 | Lomp |
| 2003/0043763 | A1 | 3/2003 | Grayson |

FOREIGN PATENT DOCUMENTS

| | | |
|---|---|---|
| CN | 1182986 | 5/1998 |
| CN | 1253424 | 5/2000 |
| CN | 1322063 | 11/2001 |
| CN | 1356802 | 7/2002 |
| CN | 1366390 | 8/2002 |
| CN | 1379932 | 11/2002 |
| CN | 1390001 | 1/2003 |
| EP | 0 945 995 | 9/1999 |
| EP | 1 028 540 | 8/2000 |
| EP | 1 071 222 | 1/2001 |
| EP | 1 158 688 | 11/2001 |
| EP | 1 220 482 | 7/2002 |
| JP | 08508152 | 8/1996 |
| JP | 12-308148 | 11/2000 |
| JP | 12308148 | 11/2000 |
| JP | 200116628 | 1/2001 |
| JP | 2001-91624 | 4/2001 |
| JP | 2001-094473 | 6/2001 |
| JP | 2001-168768 | 6/2001 |
| JP | 2001-237740 | 8/2001 |
| JP | 2001-218260 | 10/2001 |
| JP | 2002-009663 | 1/2002 |
| JP | 2002-57603 | 2/2002 |
| TW | 465204 | 11/2001 |
| WO | 93/12590 | 6/1993 |
| WO | 95/12262 | 5/1995 |
| WO | 95/22210 | 8/1995 |
| WO | 95/35638 | 12/1995 |
| WO | 96/21976 | 7/1996 |
| WO | 99/23767 | 5/1999 |
| WO | 98/30433 | 6/1999 |
| WO | 99/30433 | 6/1999 |
| WO | 99/33286 | 7/1999 |
| WO | 99/48228 | 9/1999 |
| WO | 99/65180 | 12/1999 |
| WO | 00/70792 | 11/2000 |
| WO | 00/72608 | 11/2000 |
| WO | 01/03318 | 1/2001 |
| WO | 0103318 | 1/2001 |
| WO | 01/11794 | 2/2001 |
| WO | 01/13530 | 2/2001 |
| WO | 0113530 | 2/2001 |
| WO | 01/22638 | 3/2001 |
| WO | 02/17583 | 2/2002 |

\* cited by examiner

ACCESS BURST DETECTOR CORRELATOR POOL

CROSS REFERENCE TO RELATED APPLICATION(S)

This application claims priority from U.S. provisional application No. 60/372,531, filed on Apr. 12, 2002, which is incorporated by reference as if fully set forth.

FIELD OF INVENTION

The invention generally relates to wireless code division multiple access communication systems. In particular, the invention relates to detecting access bursts in such systems.

BACKGROUND

In wireless communication systems, access bursts are commonly used to gain access to system resources. Examples of such bursts are the preambles used for access to the physical random access channel (PRACH) and the physical common packet channel (PCPCH) as proposed for the third generation partnership project (3GPP) wideband code divisional multiple access (W-CDMA) communication system.

To gain access to these channels, users transmit a preamble or signature (preamble) to the base station. The base station broadcasts the available codes and time slots that the preambles can be transmitted. The user increases the power level of the transmitted preamble until the base station detects it or until a maximum transmission power level is reached. Once the base station detects a specific user's preamble an acknowledgement (ACK), or negative acknowledgement (NAK), is sent to the user indicating the availability of the channel.

FIGS. 1A and 1B illustrate two possible user densities and cell sizes that access burst detection is used. FIG. 1A illustrates a small cell 24A with a high density of users, such as in an urban area. The base station 20 services user equipments (UEs) $22_1$ to $22_{17}$. To accommodate the large number of users, many preamble codes are used to distinguish between users. FIG. 1B illustrates a large cell 24B with a few users. The base station 20 services UEs $22_1$ to $22_3$. Having few users, only a few preamble codes are required to distinguish between users. However, preamble transmission from users (UE $22_3$) closer to the base station are received with much less delay than from users ($22_2$) at the periphery of the cell 24B. Each user synchronizes its transmissions to the received timing of the base station's transmissions. As a result, the roundtrip delay of reception of a user's transmission at the periphery of the cell is much larger than closer users. The base station 20 of FIG. 24B needs to handle these delay spreads. Based on the size of a cell and the user density, access burst detectors at base stations 20 need to differ.

Additionally, other cell parameters may differ. As shown in FIG. 2A, the cell 24 has been divided into six sectors, $26_1$ to $26_6$. The base station 20 also uses transmit and receive diversity in each sector $26_1$ to $26_6$ by using two antenna elements $28_{11}$ to $28_{62}$ per sector $26_1$ to $26_6$. A preamble transmitted in the cell 24 may be first detected by any one of the antenna elements $28_{11}$ to $28_{62}$ of any of the sectors $26_1$ to $26_6$. As a result in this arrangement, it is desirable that the base station 20 be capable of detecting any preamble code of the cell by any antenna element $28_{11}$ to $28_{62}$. By contrast in FIG. 2B, the cell is not sectorized and the base station 20 uses a single omni-direction antenna 28.

One approach to handle these varying conditions is to construct hardware to cover the maximal possible round-trip delay for every possible access code on every supported antenna. However, it is unlikely that this designed for worst possible combination of these parameters would occur. Typically, large cells utilize few access codes and small cells used to cover "hot spot areas" typically require more codes. Sectorization also tends to reduce the number of used access codes. Utilizing a worst scenario hardware design typically results in a significant amount of un-utilized hardware in some implementations or a hardware design that is used to only support implementations close to the worse case.

Accordingly, it is desirable to have a Node-B/base station capable of handling these varying conditions in a flexible manner with efficient utilization of the hardware.

SUMMARY

A Node-B/base station has an access burst detector. The access burst detector comprises at least one antenna for receiving signals from users and a pool of reconfigurable correlators. Each correlator correlates an inputted access burst code at an inputted code phase with an inputted antenna output. An antenna controller selectively couples any output of the at least one antenna to an input of any of the correlators. A code controller provides to an input of each correlator an access burst code. The code controller controls the inputted code phase of each controller. A sorter/post processor sorts output energy levels of the correlators.

BRIEF DESCRIPTION OF THE DRAWING(S)

DETAILED DESCRIPTION OF THE PREFERRED EMBODIMENT(S)

Figure 1A:
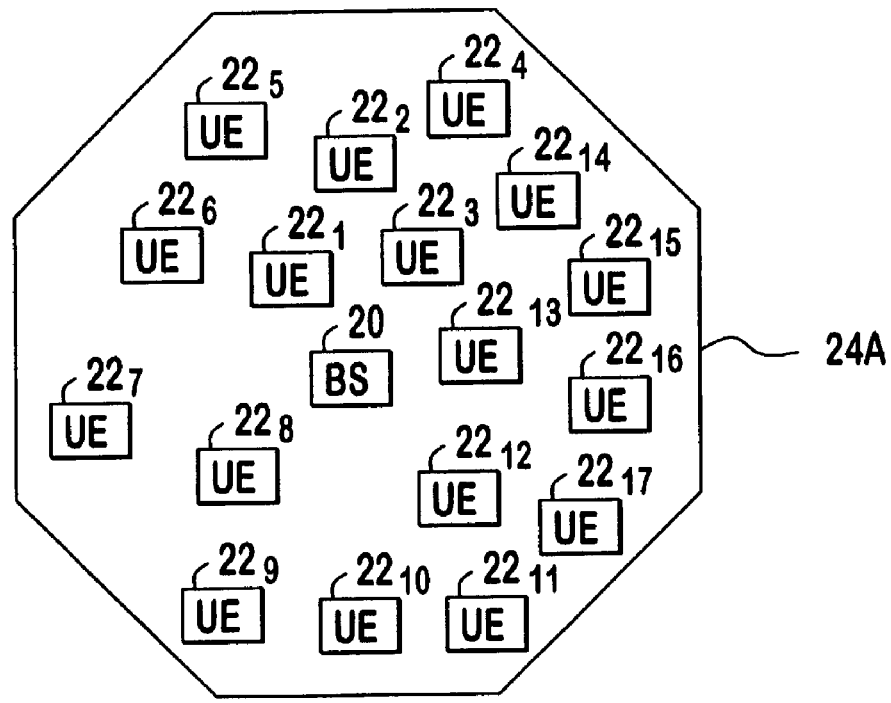
FIG. 1A is an illustration of a small cell having a large user density.
Figure 1B:
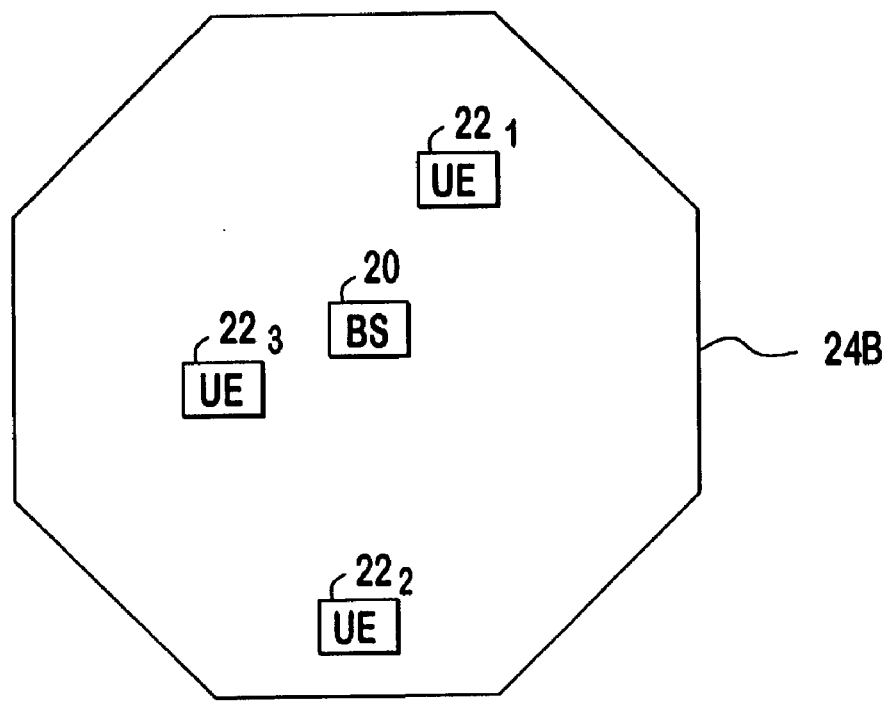
FIG. 1B is an illustration of a large cell having a small user density.
Figure 2A:
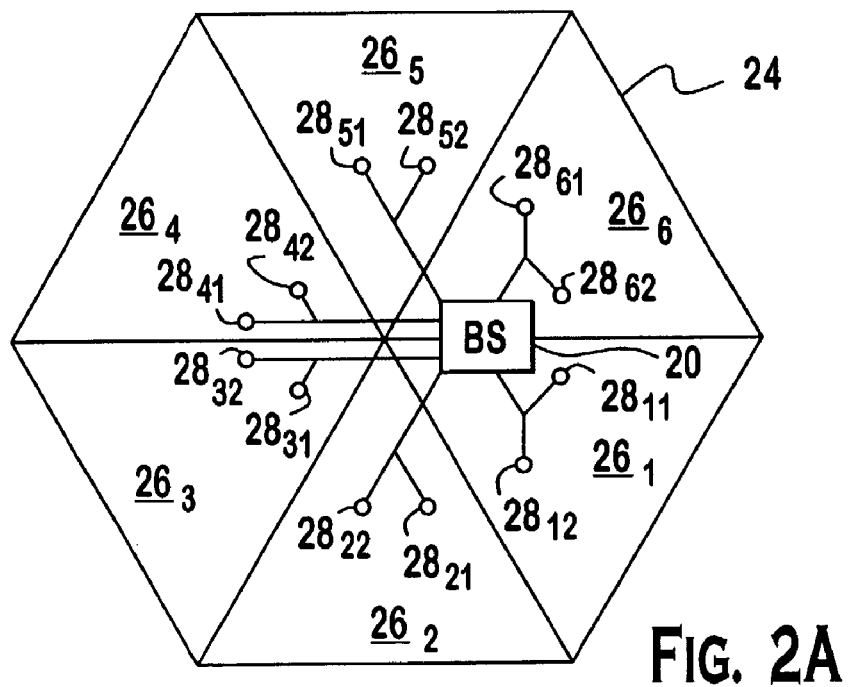
FIG. 2A is an illustration of a sectorized cell having a base station using two antenna elements per sector.
Figure 2B:
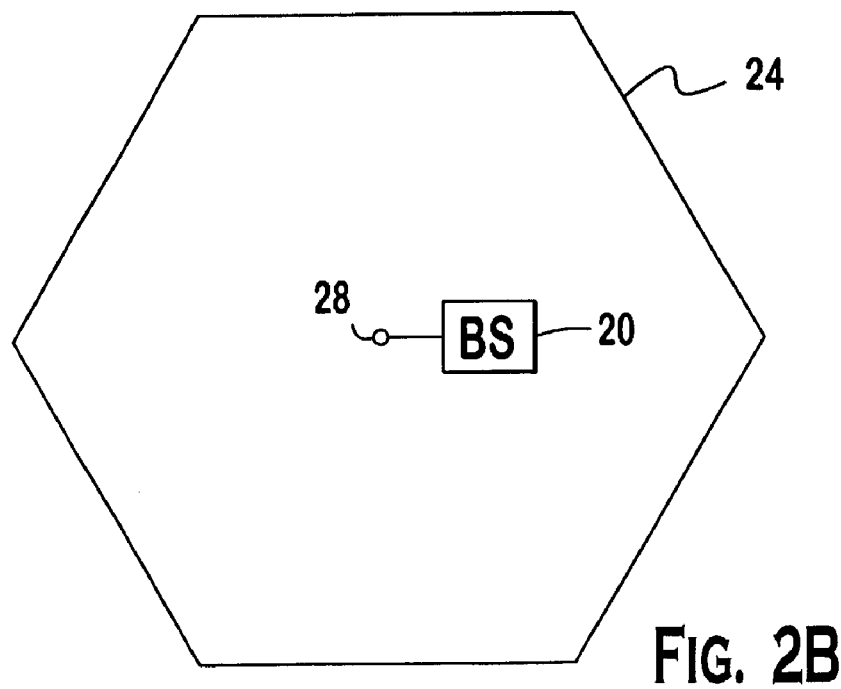
FIG. 2B is an illustration of an unsectorized cell having a base station with one omni-directional antenna.
Figure 3:
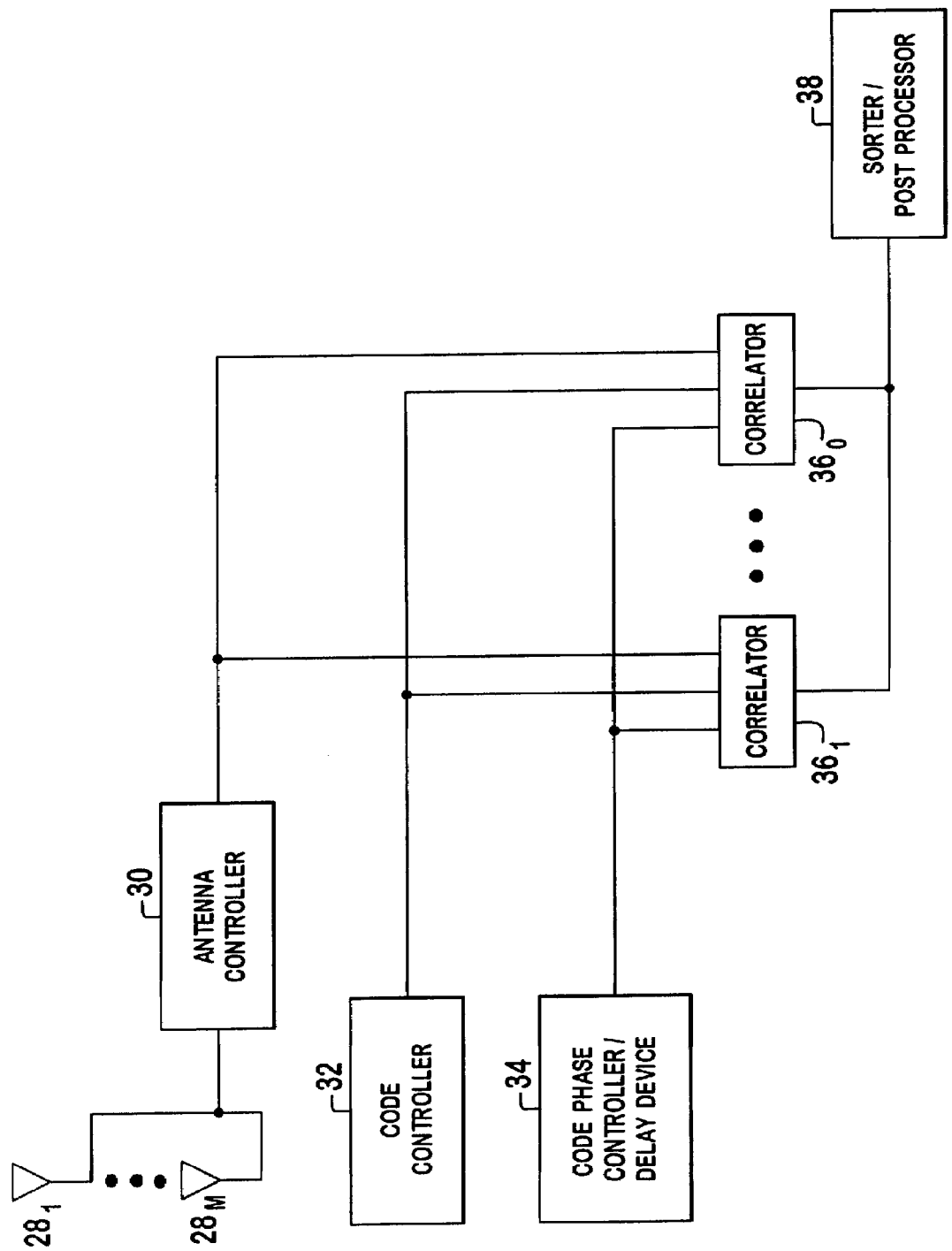
FIG. 3 is a simplified diagram of an embodiment of an access burst detector.

FIG. 3 is a simplified block diagram of a simplified block diagram of a preferred base station/Node-B access burst detector. Each antenna $28_1$ to $28_M$ of the base station/Node-B is coupled to an antenna controller 30. The number of antennas, M, varies. For a base station/Node-B using one omni directional antenna, the number of antennas is one. For sectored cells using an antenna array for each sector, the number of antennas may be large. To illustrate referring to FIG. 2A, a six sector cell with two antennas per sector would have twelve (12) antennas. The antenna controller 30 effectively controls the coupling of the antenna outputs to the correlators $36_1$ to $36_O$.

For each access code used by the base station/Node-B, the controller controls the access code input into each correlator $36_1$ to $36_O$. A code phase controller/delay device 34 controls the code phase/delay that each correlator $36_1$ to $36_O$ operates. Each correlator $36_1$ to $36_O$, such as a matched filter, is configured to correlate a given input code with a given input antenna output at a given code phase/delay. As a result, each correlator $36_1$ to $36_O$ preferably is reconfigurable to correlate any of the antenna outputs with any of the codes at any code phase/delay.

The correlators $36_1$ to $36_O$ effectively form a reconfigurable correlator pool. The reconfigurability of the correlator pool allows for a versatile utilization of the design for varying environments. The uniform reconfigurability of each correlator facilitates implementing the correlators using a small scalable design, which is highly advantageous for use on an application specific integrated circuit (ASIC). For ASICs having a clock rate exceeding the chip rate, each reconfigurable correlator can be used to process multiple antenna/code/code phase combinations. To illustrate for a 48× chip rate clock, each correlator can process 48 antenna/code/code phase combinations.

The output of each correlator $36_1$ to $36_O$ is processed by a sorter/post processor 38. The sorter/post processor 38 sorts the various code/code phase combinations in order of correlator output energy. Access codes exceeding a predetermined correlated energy threshold are deemed to be detected. In response to detecting an access code, a corresponding ACK or NAK is sent to indicate whether the requested resources are available.

Figure 4:
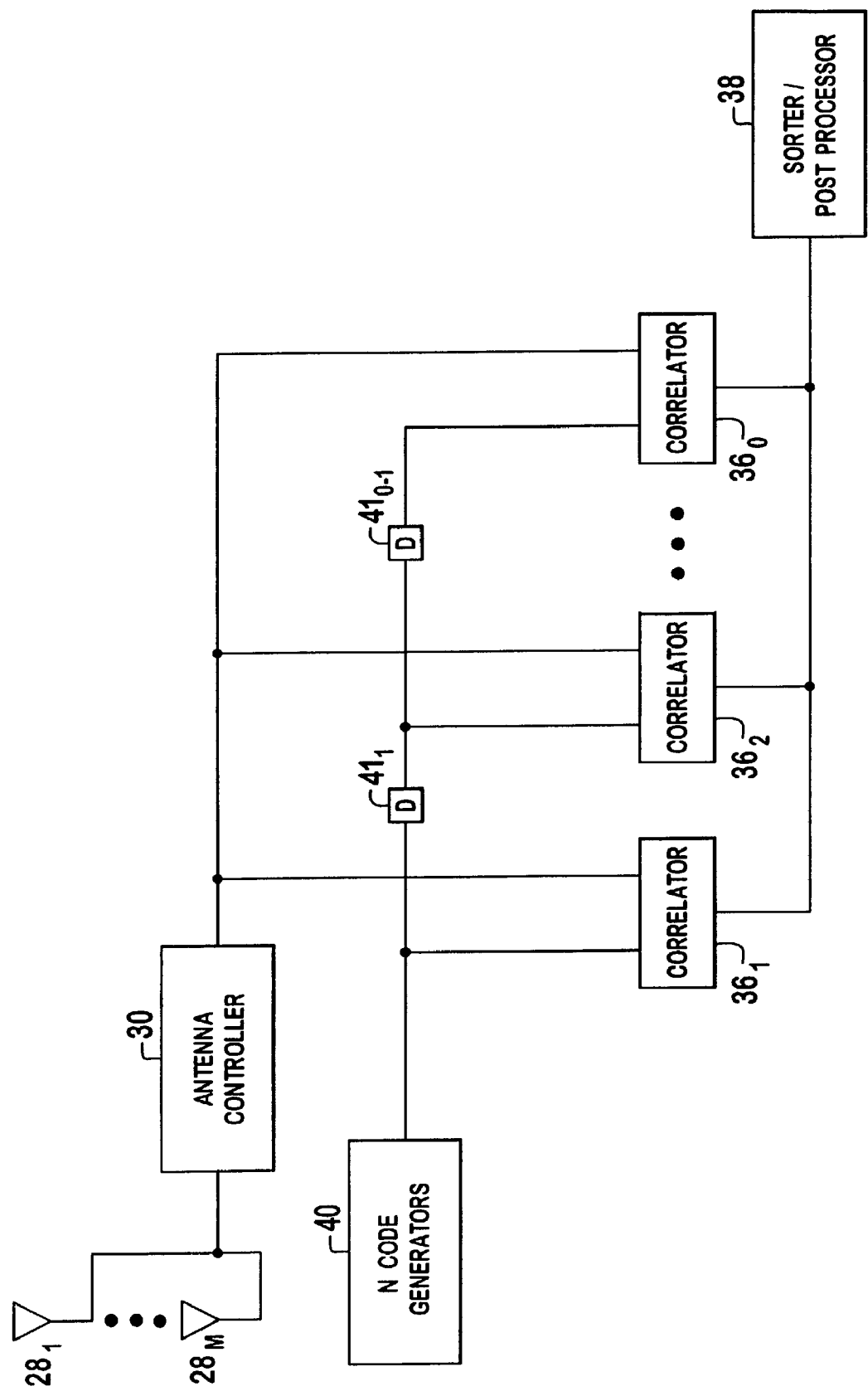
FIG. 4 is a simplified diagram of an embodiment of an access burst detector.

FIG. 4 is another configuration for an access burst detector. Similar to the configuration of FIG. 3, the antenna controller 30 effectively controls the coupling of each antenna element output to each correlator $36_1$ to $36_O$. N code generators 40 produce N codes. A series of delay devices $41_1$ to $41_{O-1}$ produces a series of delayed versions of the codes. Preferred values for each delay are one chip or a half chip. As a result, the codes input into each correlator $36_1$ to $36_O$ are delayed versions of the same codes. To illustrate, if each delay is a one chip delay, the correlators receive a window of delayed code versions over a window of O chips. As a result, the correlator bank can correlate a given code over a delay spread of O chips. The output of each correlator $36_1$ to $36_O$ is processed by a sorter/post processor 38.

In one implementation for preamble detection, the access burst detector of FIG. 4 has 48 code generators (N=48), 64 correlators (O=64) and operates as 48× the chip rate. The detector can process 48 code/antenna combinations, such as four codes over 12 antennas, over a cell radius of 64 chips. The cell radius can be doubled to 128 chips by halving the code/antenna combinations to 24. Since the delay bank is only spans 64 chips, half of the code generators produce codes at a 64 chip delay to service the full cell radius.

Figure 5A:
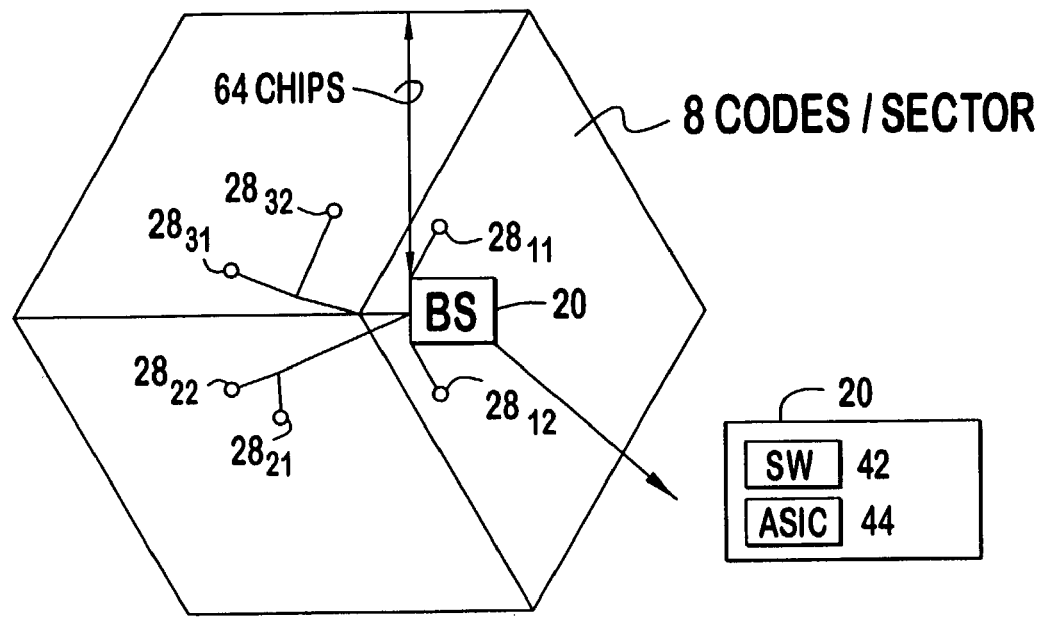
FIG. 5A is an illustration of a small sectored cell serviced by a base station using one ASIC and software.
Figure 5B:
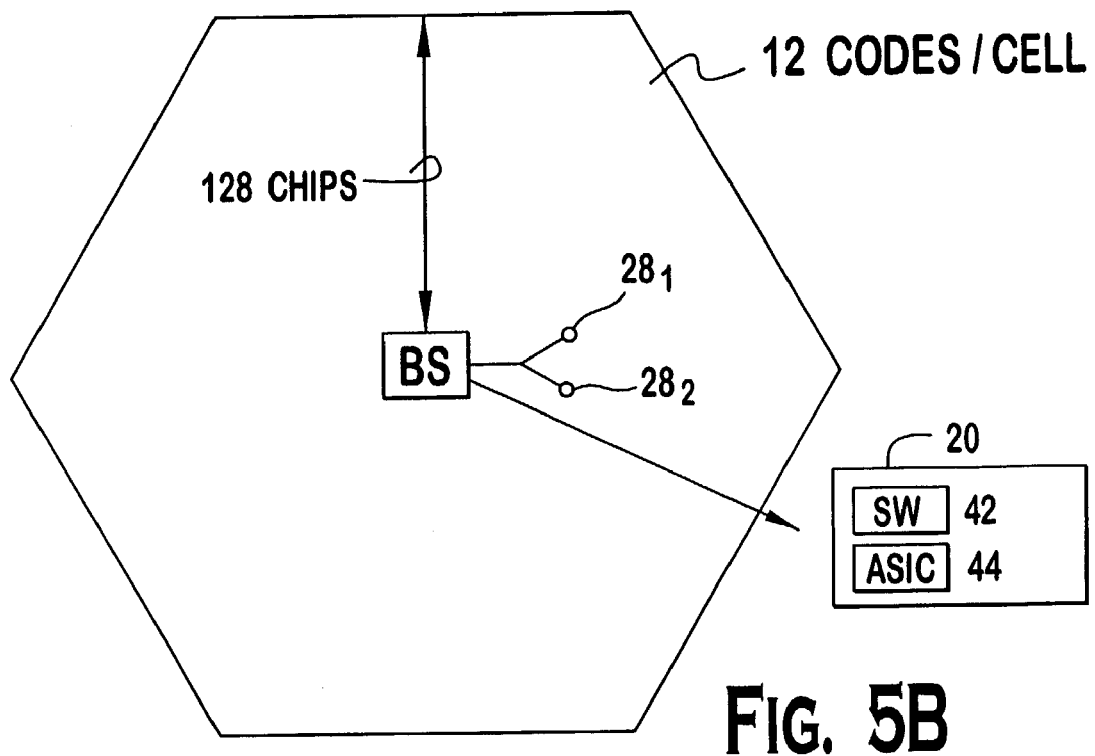
FIG. 5B is an illustration of a large unsectored cell serviced by a base station using one ASIC and software.
Figure 5C:
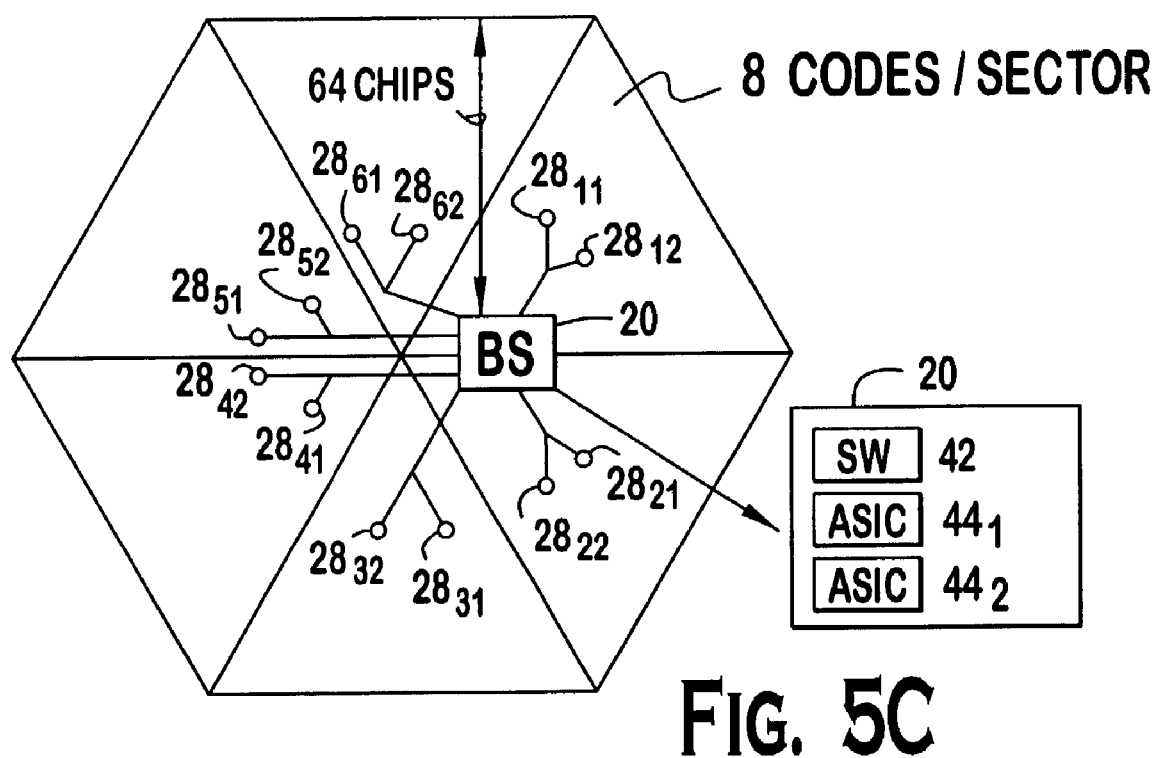
FIG. 5C is an illustration of a small cell with six sectors serviced by a base station using two ASICs and software.

Due to the flexibility of the correlator bank, the access burst detector is flexible and scalable to varying base station/Node-B implementations, as illustrated by FIGS. 5A, 5B and 5C. For an access burst detector ASIC capable of handling 3072 code/antenna/delay combinations, one ASIC 44 can handle the layout of the cell of FIG. 5A. In FIG. 5A, the cell has three sectors, each sector is assigned two antenna elements $28_{11}$ to $28_{32}$. The cell has a radius of 64 chips. Eight access codes may be used in each sector. The base station 20 uses one ASIC 44 to handle the cell (8 codes×12 antenna elements×64 chips=3072 code/antenna/delay combinations).

In FIG. 5B, the cell has a radius of 128 chips. The cell has no sectors and is handled by two antenna elements $28_{11}$ and $28_{62}$. Twelve access codes may be used by the cell. The base station 20 uses one ASIC 44 to handle the cell (12 codes×two antenna elements×128 chips=3072 code/antenna/delay combinations).

In FIG. 5C, the cell is the same size as FIG. 5A, 64 chip radius. However, the cell has a higher density and is divided into six sectors. Each sector is serviced by two antenna elements $28_{11}$ to $28_{62}$. Eight access codes may be used in each sector. The base station 20 uses two ASICs $44_1$ and $44_2$ to handle the cell (8 codes×12 antenna elements×64 chips=3072 code/antenna/delay combinations). Accordingly, the same ASIC 44 can be used for both the cells of FIGS. 5A and 5B by software 42 modifications. To handle the higher requirements of FIG. 5C, two ASICs $44_1$ and $44_2$ are used. The division of the code/antenna/delay combinations the each ASIC $44_1$ and $44_2$ is responsible for is preferably controlled by the software 42.

Figure 6:
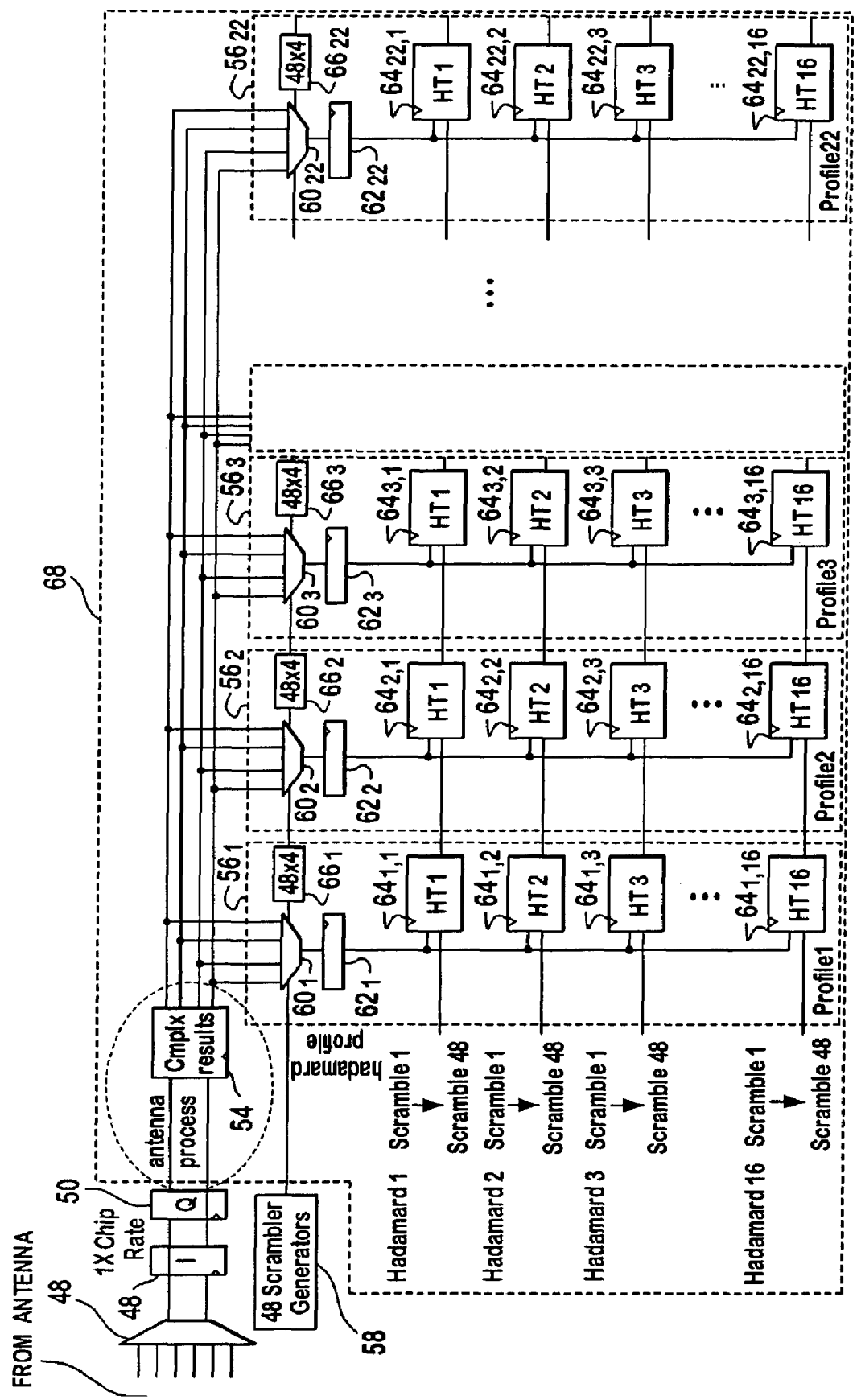
FIG. 6 is a diagram of a preferred 3GPP correlator bank.

FIG. 6 is a diagram of a preferred correlator bank 68 for a 3GPP access burst detector. The correlator bank 66 is coupled to one of the antennas 28 by a multiplexer (MUX) 46. The MUX 66 selects one of the antenna outputs for use by the correlator bank 66. In a 3GPP system, the access bursts are sent using quadrature phase shift keying (QPSK) modulation. An in-phase sampling device 48 and a quadrature sampling device 50 produce in-phase (I) and quadrature (Q) samples of the selected antenna output. The samples are processed by a complex results device 54 to produce complex results.

Preferably, 48 access codes are produced by 48 scrambling code generators 58. Each access code carries 16 signatures as per the 3GPP standard. In the preferred implementation, a 48 times chip rate clock is used. For a given chip period, the correlators $56_1$ to $56_{22}$ (56) sequentially correlate each of the 48 access codes during each clock period.

Each correlator 56 has a MUX $60_1$ to $60_{22}$ (60) for effectively mixing one of the access codes with an antenna output. A buffer $62_1$ to $62_{22}$ (62) stores the mixed result. To handle the sixteen signatures within an access code, 16 Hadamard signature detectors $64_{1,1}$ to $64_{22,16}$ are used to detect the 16 signatures. The preferred number of correlators 56 is 22. Between each correlator 56 is a buffer $66_1$ to $66_{22}$, which delays the code by one chip, prior to entry into the subsequent correlator 56. As a result, the correlator bank 66 in one clock period correlates one access code for 16 signatures over a delay spread of 22 chips.

Using the implementation of FIG. 6, one correlator bank 68 is capable of handling 48 access codes over a chip delay of 22 chips in one chip period. To extend the range of the Node-B, half of the produced codes can be 22 chip delayed versions of the other codes. As a result, the correlator bank 68 can process 24 access codes over a delay of 44 chips in one chip period. Alternately, the correlator bank 68 may process multiple antennas in one period by reducing the number of correlated access codes.

By adding correlators 56 to the correlator bank, the chip range of the bank 56 can be extended in alternate implementations. Also, by varying the produced access codes and the clock rate, the number of processed codes can be changed.

What is claimed is:

1. A Node-B/base station having an access burst detector comprising:
   at least one antenna for receiving signals from users;
   a pool of reconfigurable correlators, each correlator for correlating an inputted access burst code at an inputted code phase with an inputted antenna output of the at least one antenna;
   an antenna controller for selectively coupling any output of the at least one antenna to an input of any of the correlators;

a code controller for providing to an input of each correlator an access burst code, the code controller capable of providing any access burst code to any correlator;

a code phase controller for controlling the inputted code phase of each correlator; and a sorter/post processor for sorting output energy levels of the correlators.

2. The Node-B/base station of claim 1 wherein the reconfigurable correlators are reconfigurable matched filters.

3. A Node-B/base station having an access burst detector comprising:

at least one antenna for receiving signals from users;

a pool of reconfigurable correlators, each correlator for correlating an inputted access burst code with an inputted antenna output of the at least one antenna;

an antenna controller for selectively coupling any output of the at least one antenna to an input of any of the correlators;

a plurality of code generators for outputting a plurality of access codes;

a series of delays, each delay delaying the plurality of access codes by a predetermined amount, the output of each of the series of delays being input into a different correlator of the correlators; and a sorter/post processor for sorting output energy levels of the correlators.

4. The Node-B/base station of claim 3 wherein the reconfigurable correlators are reconfigurable matched filters.

5. The Node-B/base station of claim 3 wherein each delay is a one chip delay.

6. The Node-B/base station of claim 3 wherein the plurality of code generators produce a set of codes at a plurality of different delays.

7. A scalable Node-B/base station comprising:

at least one antenna for receiving signals from users;

at least one application specific integrated circuit (ASIC) having a pool of reconfigurable correlators, each correlator for correlating an inputted access burst code at an inputted code phase with an inputted antenna output of the at least one antenna, the at least one ASIC having an antenna controller for selectively coupling any output of the at least one antenna to an input of any of the correlators;

software for reconfiguring the selective coupling as additional ASICs are added at the Node-B/base station, each additional ASIC having a pool of reconfigurable correlators;

a sorter/post processor for sorting output energy levels of the correlators.

8. The scalable Node-B/base station of claim 1 wherein the reconfigurable correlators are reconfigurable matched filters.

9. The scalable Node-B/base station of claim 7 wherein each ASIC further comprising a plurality of code generators, an access code produced by each code generator is reconfigurable by the software.

10. The scalable Node-B/base station of claim 6 wherein a code phase of the access code produced by each code generator is reconfigurable by the software.

11. A method for configuring an access burst detector for a Node-B/base station, the method comprising:

providing a bank of correlators, the bank of correlators having a plurality of correlators, each correlator capable of selecting one of a plurality of access codes and correlating that access code with an inputted signal, each of the plurality of correlators receiving a different delayed version of the selected one code and the set of correlators spanning a preassigned delay spread;

determining a cell radius to be serviced by the Node-B/base station and a delay spread associated with the cell radius;

if the cell radius delay spread is greater than the preassigned delay spread, assigning ones of the plurality of access codes to be delayed versions of others of the access codes;

if the cell radius delay spread is not greater than the preassigned delay spread, not assigning ones of the plurality of access codes to be delayed versions of others of the access codes; and detecting access codes using the bank of correlators and the assignment of the plurality of access codes.

* * * * *

UNITED STATES PATENT AND TRADEMARK OFFICE
CERTIFICATE OF CORRECTION

| | | |
|---|---|---|
| PATENT NO. | : 7,630,690 B2 | Page 1 of 1 |
| APPLICATION NO. | : 10/411739 | |
| DATED | : December 8, 2009 | |
| INVENTOR(S) | : Kaewell, Jr. et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1287 days.

Signed and Sealed this

Second Day of November, 2010

David J. Kappos
*Director of the United States Patent and Trademark Office*